A. HAYES.
METHOD OF FORMING A LIQUID FUEL.
APPLICATION FILED JUNE 5, 1919.
1,428,885.   Patented Sept. 12, 1922.
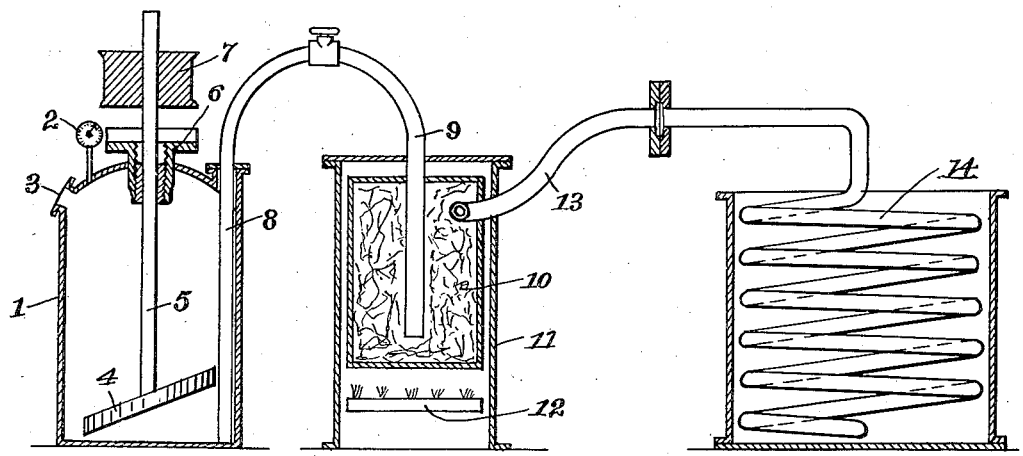
Inventor
Albert Hayes Patented Sept. 12, 1922.

1,428,885

UNITED STATES PATENT OFFICE.

ALBERT HAYES, OF NEW YORK, N. Y., ASSIGNOR, BY MESNE ASSIGNMENTS, TO U. S. INDUSTRIAL ALCOHOL CO., A CORPORATION OF WEST VIRGINIA.

METHOD OF FORMING A LIQUID FUEL.

Application filed June 5, 1919. Serial No. 302,066.

*To all whom it may concern:*

Be it known that I, ALBERT HAYES, a citizen of the United States, residing at New York, in the county of New York, State of New York, have invented certain new and useful Improvements in Methods of Forming a Liquid Fuel, of which the following is a description, reference being had to the accompanying drawings, forming a part hereof.

My invention relates to a method of forming a liquid fuel for use in explosion engines and for other purposes, and has for its object to provide a method for this purpose which will be effective to produce a liquid fuel of a permanent, non-stratifying character from relatively inexplosive ingredients and at very low cost of manufacture.

With these and other objects hereinafter explained in view, my invention consists in the method hereinafter described and claimed.

The drawing is a diagrammatic view partly in section of an apparatus adapted for carrying out the method of my invention, it being understood that the drawing is illustrative merely and is not intended to restrict the invention to the use of the apparatus shown or to any particular apparatus.

In the drawing 1 indicates a tank in which is placed the mixture from which the improved liquid fuel is made. This tank is provided with a pressure gage 2, an inlet 3 through which the mixture may be introduced and through which air under pressure may be supplied. The tank is provided with an agitator 4, here shown as carried by a shaft 5 extending through a suitable gland 6 and provided outside the tank with a pulley 7 for rotating it.

From the interior of the tank near its lower end a delivery pipe 8 extends upward and outward leading to a downwardly extending pipe 9 which extends nearly to the lower end of a vertically arranged catalyst 10 which is enclosed in a suitable casing 11 and is arranged to be heated by a suitable burner 12. From a point near the upper end of the catalyst a pipe 13 leads to the upper end of the worm 14 of a condenser.

In the tank 1 I place a mixture of relatively heavy hydrocarbon, such as low grade kerosene, alcohol, benzol and ether, the kerosene and alcohol being the main ingredients of the mixture, a relatively small proportion of benzol being used and a much smaller proportion of ether.

This mixture is kept constantly agitated in the tank to cause the several ingredients which differ somewhat in specific gravity to be thoroughly mixed and to prevent stratification. This mixture from near the bottom of the tank is forced by the pressure of the air in the tank into the delivery pipe 8, from which it flows into the pipe 9 and from the pipe 9 into the catalyst 10, which is filled with a finely divided catalyst comprising finely divided zinc or nickel particles carried by a burned clay carrier which may be rich in aluminum compounds, the particles of zinc and nickel forming a relatively small proportion of the mixture, but being preferably well distributed through the mass. This catalyst is kept heated by the burner 12, preferably to a temperature of about 250 degrees C., though this temperature may be varied somewhat, but should not exceed 300 degrees C. This heat is sufficient to vaporize the oil mixture and the vapors pass upward through the material with which the catalyst is filled and are subjected as vapors to the catalytic action of such material by which they are caused to form a permanent compound from which the ingredients will not separate. This compound as it passes from the upper end of the catalyst is ready for use in an explosion engine, it being necessary only to mix with it the amount of air required for forming an explosive mixture.

In order that the compound may be in condition for storage and transportation, the vapors from the catalyst are led by the pipe 13 to the worm of the condenser from the outlet of which the condensate flows into a suitable storage receptacle (not shown). This condensate is of a permanent character and may be kept indefinitely at any temperature or at varying temperatures without stratification or separation of its ingredients.

The heavy hydrocarbon oil may be of very low grade. The so-called fuel oil may be used or any oil of similar grade.

I do not herein claim the apparatus described and shown as that forms the subject-matter of a separate application for Letters Patent filled of even date herewith, Serial No. 302,065.

Having thus described my invention, what I claim is:

1. The process of making a fuel of non-stratifying character which comprises subjecting a vaporized mixture of a heavy hydrocarbon oil and alcohol containing small proportions of a light hydrocarbon and ether, to the action of a finely divided zinc or nickel catalyst at a temperature below about 300 degrees C.

2. The process of making a fuel of non-stratifying character which comprises subjecting a vaporized mixture of a heavy hydrocarbon oil and alcohol containing small proportions of a light hydrocarbon and ether, to the action of a finely divided zinc and nickel catalyst at a temperature below about 300 degrees C.

3. The process of making a fuel of non-stratifying character which comprises subjecting a vaporized mixture of kerosene and alcohol containing small proportions of a light hydrocarbon and ether, to the action of a finely divided zinc or nickel catalyst at a temperature below about 300 degrees C.

4. The process of making a fuel of non-stratifying character which comprises subjecting a vaporized mixture of kerosene and alcohol containing small proportions of a light hydrocarbon and ether, to the action of a finely divided zinc and nickel catalyst at a temperature below about 300 degrees C.

5. The process of making a fuel of non-stratifying character which comprises subjecting a vaporized mixture of kerosene and alcohol containing small proportions of benzol and ether, to the action of a finely divided zinc and nickel catalyst at a temperature below about 300 degrees C.

6. The process of making a fuel of non-stratifying character which comprises subjecting a vaporized mixture of a heavy hydrocarbon oil and alcohol containing small proportions of a light hydrocarbon and a smaller proportion of ether, to the action of a finely divided zinc or nickel catalyst at a temperature below about 300 degrees C.

7. The process of making a fuel of non-stratifying character which comprises subjecting a vaporized mixture of a heavy hydrocarbon oil and alcohol containing small proportions of a light hydrocarbon and a smaller proportion of ether, to the action of a finely divided zinc and nickel catalyst at a temperature below about 300 degrees C.

8. The process of making a fuel of non-stratifying character which comprises subjecting a vaporized mixture of kerosene and alcohol containing small proportions of benzol and a smaller proportion of ether, to the action of a finely divided zinc and nickel catalyst at a temperature below about 300 degrees C.

9. The process of making a fuel of non-stratifying character which comprises mixing together a low grade kerosene and alcohol with a smaller proportion of benzol and ether, agitating the mixture to prevent separation, vaporizing it in the presence of a finely divided zinc and nickel catalyst at a temperature of about 250 degrees C., removing the vapors from the catalyst and condensing them.

In testimony whereof I affix my signature this 5th day of June, 1919.

ALBERT HAYES.